United States Patent
Rezaie et al.

(10) Patent No.: US 6,396,847 B1
(45) Date of Patent: May 28, 2002

(54) DIALABLE DATA SERVICES/TDM BANDWIDTH MANAGEMENT

(75) Inventors: Hamid Rezaie, Dallas; Samuel Lisle, Allen, both of TX (US); Masahiro Shinbashi, Kamagawa; Kazuhiko Taniguchi, Kanagawa, both of (JP); David Chen, Plano, TX (US); Edward Sullivan, Highland Village, TX (US); Mark Barratt, Lucas, TX (US); Richard DeBoer, Manotick (CA)

(73) Assignee: Fujitsu Networks Communications, Inc., Richardson, TX (US)

( * ) Notice: Subject to any disclaimer, the term of this patent is extended or adjusted under 35 U.S.C. 154(b) by 0 days.

(21) Appl. No.: 09/324,721

(22) Filed: Jun. 3, 1999

(51) Int. Cl.[7] ............................. H04J 3/16; H04J 3/22
(52) U.S. Cl. ................. 370/468; 370/376; 370/395.1; 370/541; 370/535
(58) Field of Search ....................... 370/468, 389, 370/398, 399, 422, 431, 376, 351, 375, 539, 535, 537, 229, 230, 235, 395.1, 395.21, 395.4, 395.41, 395.5

(56) References Cited

U.S. PATENT DOCUMENTS

| | | | | |
|---|---|---|---|---|
| 5,345,446 A | * | 9/1994 | Hiller et al. | 370/395 |
| 5,953,330 A | * | 9/1999 | Canniff et al. | 370/352 |
| 6,125,111 A | * | 9/2000 | Snow et al. | 370/360 |
| 6,134,238 A | * | 10/2000 | Noh | 370/395 |
| 6,141,346 A | * | 10/2000 | Caldara et al. | 370/390 |

FOREIGN PATENT DOCUMENTS

| | | |
|---|---|---|
| EP | 0528206 A2 | 2/1993 |
| EP | 0529649 A2 | 3/1993 |
| EP | 0818940 A2 | 1/1998 |

OTHER PUBLICATIONS

Bernie Assa, "Today's Transport Networks—Are They Ready for ATM?," *National Fiber Optic Engineers Conference Proceedings*, Sep. 8–12, 1996, 16 pp.

Noh, T. H.: "ATM Scenarios for SDH/SONET Networks", Bell Labs Technical Journal, US, Bell Laboratories, vol. 3, No. 1, 1998, pp. 81–93, XP000750438 ISSN: 1089–7089, figure 2B.

* cited by examiner

*Primary Examiner*—Ajit Patel
(74) *Attorney, Agent, or Firm*—Baker Botts L.L.P.

(57) ABSTRACT

A communications device and method for effectively managing bandwidth within a telecommunications network carrying both time division multiplexed signals as well as data signals. The communications device having dialable TDM/cell and/or packet-based bandwidth management capability so that a network operator can select to manage bandwidth for any particular signal on in STS, VT, or cell or packet basis.

16 Claims, 5 Drawing Sheets

DIALABLE DATA SERVICES/TDM BANDWIDTH MANAGEMENT

The present invention relates generally to a network element for use in a telecommunications network in which the bandwidth utilized by various signals is dialably managed so as to improve efficiency. This management is selectively performed on an STS, VT, or data cell or packet basis.

BACKGROUND ART

Network elements that manage bandwidth to improve efficiency exist, such as SONET add/drop multiplexers and SONET cross connects. However, such devices traditionally manage bandwidth at a STS or a virtual tributary (VT) level. In recent years, more and more data services are being added to telecommunications networks. As data services are added to telecommunications networks, the need for more efficient use of bandwidth by data services will grow. However, the need for efficient use of bandwidth by synchronous time division multiplexed (TDM) signals will remain. Thus, there is a need for products that address the changing the telecommunications environment by permitting network operators to efficiently and dialably manage bandwidth utilized by both traditional TDM signals and data signals, such as ATM traffic.

SUMMARY OF THE INVENTION

The present invention provides an apparatus and method for efficiently managing bandwidth in a telecommunications network carrying both TDM services and data services. By efficiently managing bandwidth, network operators are able to save money on capital expenditures for equipment and thereby keep operating costs down. In the highly competitive telecommunications services arena, this provides network operators with a competitive advantage.

An embodiment of the present invention provides a network element that is outfitted to accept signals from a telecommunications network. The signals are then routed to an STS selector that routes the signals to a bandwidth management device. The bandwidth management device for each signal being dialably selectable by a network operator. The bandwidth management devices include a device for managing signals on an STS level, on a VT level, and on a data packet or cell level. For simplicity purposes, the word cell, as used hereinafter, shall be understood to mean cell or packet, as the principles of the present invention are as easily applicable to packet-based signals as they are to cell-based signals.

An embodiment of the present invention provides a network element for managing bandwidth capable of circuit-based multiplexing at and STS-n and a VT-n level and capable of cell-based multiplexing.

An embodiment of the present invention provides that the device for managing signals at a cell level, manages both the virtual channel and virtual path of ATM cells.

It is thus an object of present invention to selectively and effectively manage bandwidth utilized within telecommunications networks having both circuit-based and cell-based traffic.

It is a further object of an embodiment of the present invention to selectively and effectively manage bandwidth utilized within a telecommunications network having both TDM and ATM signals.

It is a further object of an embodiment of the present invention to selectively and effectively manage bandwidth at an STS level, at a VT level, or at a virtual channel and virtual path level.

BRIEF DESCRIPTION OF THE DRAWINGS

These and other objects and advantages of the present invention will become more apparent and more readily appreciated by reference to the description of the preferred embodiments, taken in conjunction with the accompanying drawings, of which.

DETAILED DESCRIPTION OF PREFERRED EMBODIMENTS

The present invention will be better understood by reference to the accompanying drawings.

Figure 1:
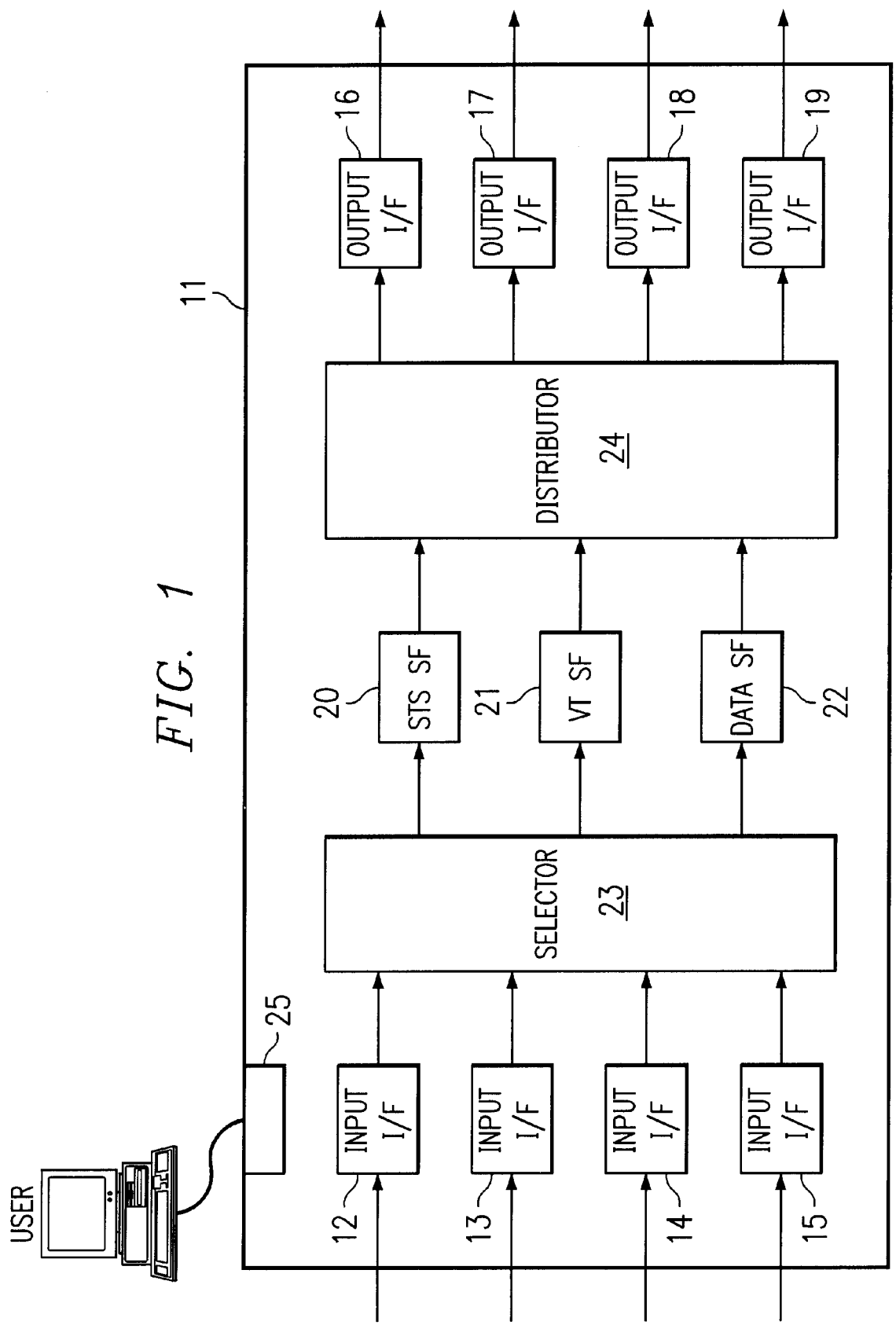
FIG. 1 is a block diagram of a network element according to an embodiment of the present invention.

FIG. 1 depicts a network element 11 according to an embodiment of the present invention, equipped to accept various types of signals. For instance, a DS 1 signal from the telecommunications network (not shown) can be accepted into network element 11 through input interface 12, a DS 3 signal from the telecommunications network can be accepted into network element 11 through input interface 13, an OC-n signal from the telecommunications network can be accepted into network element 11 through input interface 14, and a data signal, from a LAN for instance, can be accepted into network element 11 through input interface 15. Preferably, each of the interface cards 12 through 15 is be outfitted so as to be capable of receiving different types of signals. The signals accepted from the telecommunications network on input interfaces 12 through 15 are then built up into STS-n signals, such as STS-1s, and passed from the input interfaces 12 through 15 to STS selector 23. STS selector 23 then the routes each of the STS-n signals it receives from input interfaces 12 through 15 to STS time slot interchanger 20, VT time slot interchanger 21 or data switch 22 respectively. It should be noted that STS selector 23 may also multiplex and/or demultiplex STS-n signals to other STS rates prior to routing them for ease of transport within the network element 11.

By use of a user interface 25, a network operator is able to select or dial, preferably for each individual STS-1 contained within the STS-n signals entering the STS selector 23, how the STS-n signals from the input interfaces 12 through 15 are routed by STS selector 23. The selection process is preferably implemented through software, although it may be performed through hardware, such as switches or relays, or through firmware. It should be noted that the selection process could be done in a manner that is automated, rather than a having a network operator make the selection. Further, in the case where a network operator is making the selection, it need not be on a real-time basis.

For STS signals that are routed to STS time slot interchanger 20 by STS selector 23, STS time slot interchanger 20 manages their bandwidth on an STS level, preferably on an STS-1 level. For implementations where the incoming signals are STS-n rates of higher than STS-1s, the management may be at any STS-n rate up to the lowest rate of an incoming signal into STS time slot interchanger 20.

For STS-n signals that are routed to VT time slot interchanger 21 by STS selector 23, VT time slot interchanger 21 manages their bandwidth on a VT-n level, preferably a VT-1 level.

For STS-n signals that are routed to data switch 22 by STS selector 23, data switch 22 manages bandwidth on a cell level. Should data switch 22 be an ATM switch, it should preferably manage both the virtual channel and virtual path of each cell.

STS time slot interchanger 20, VT time slot interchanger 21 and data switch 22 then send managed signals built back up into STS-n signals, to STS distributor 24. STS distributor 24 then distributes the signals to the appropriate output interfaces 16 through 19. Output interfaces 16 through 19 then pass the outgoing signals back out to the network. The outgoing signals from the output interfaces 16 through 19 can be of any type, but preferably of an OC-n type.

Figure 2:
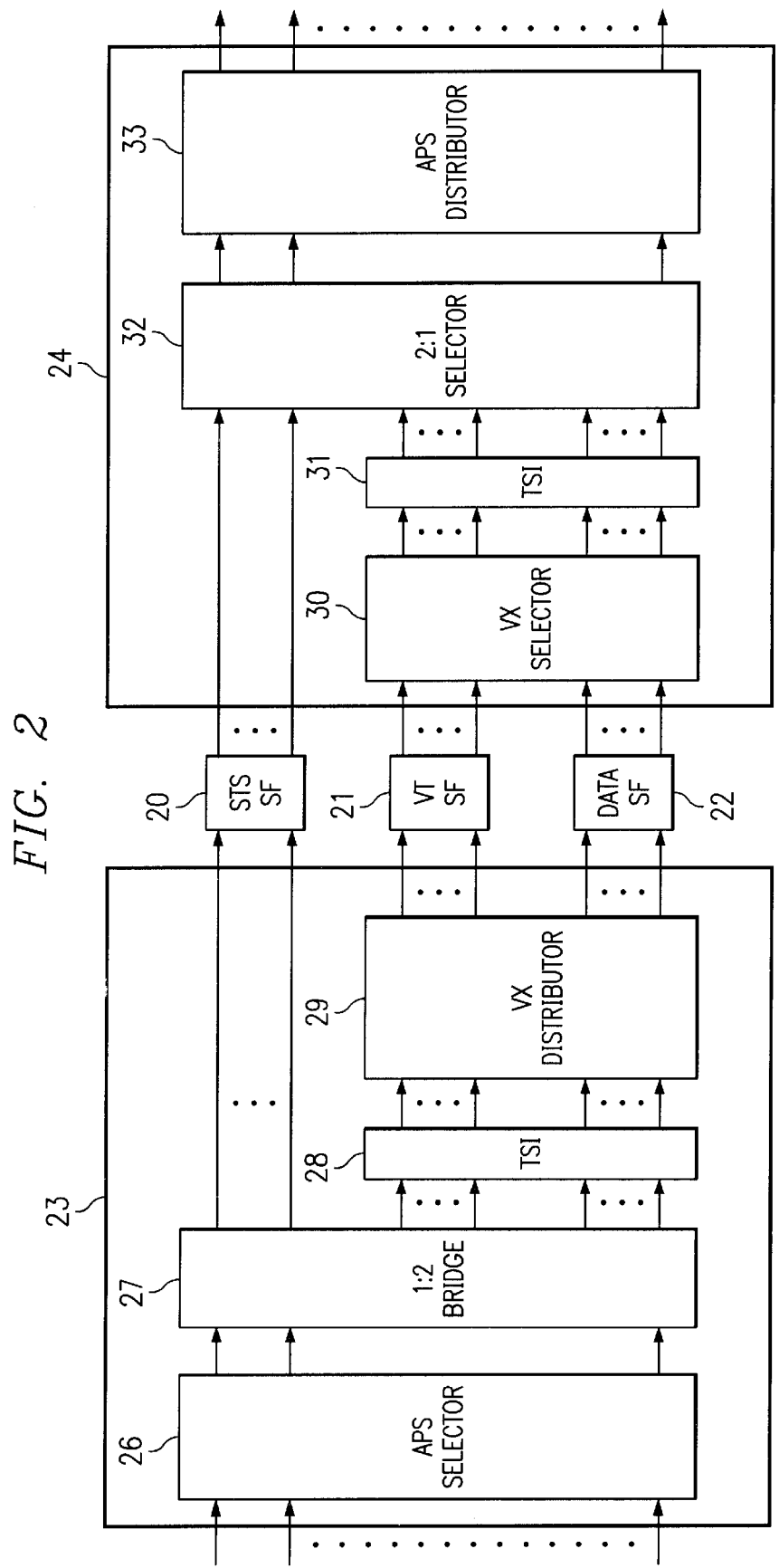
FIG. 2 is a more detailed block diagram of a network element according to an embodiment of the present invention.

FIG. 2 depicts a more detailed view of STS selector 23, STS distributor 24 and their interworkings with STS time slot interchanger 20, VT time slot interchanger 21 and data switch 22 according to an embodiment of the present invention. For sake of simplicity, redundant components are not shown. As can be seen in FIG. 2, signals coming into STS selector 23 enter APS (Automatic Protection Switching) selector 26. In an arrangement where redundant components are being used, APS selector 26 selects the signals received from those interfaces that are active. APS selector 26 may also demultiplex any higher rate STS-n signals it receives so that all STS-n signals it passes on will be of the same rate. Preferably, this is an STS-1 rate. APS selector 26 then provides the signals to a 1:2 bridge 27. The 1:2 bridge 27 provides selective connectivity between the signals received from APS selector 26 and STS time slot interchanger 20 or time slot interchanger 28. For instance, if the network operator has dialed a certain STS-1signal to be managed on an STS basis, 1:2 bridge 27 will provide connectivity between APS selector 26 and STS time slot interchanger 20. If the network operator has dialed the certain STS-1signal to be managed on a VT or a cell basis, 1:2 bridge 27 will provide connectivity between APS selector 26 and time slot interchanger 28.

For the signals provided to time slot interchanger 28, time slot interchanger 28 outputs two sets of signals (preferably STS-1signals) to Vx director 29. The first set of signals being those for which the network operator has dialed to be managed on a VT basis and the second set being those for which the network operator has dialed to be managed on a cell basis. Vx director 29 preferably multiplexes the incoming STS-1signals to be managed on a VT basis into higher rate STS-n signals, such as STS-12 signals, and provides them to VT time slot interchanger 21. Vx director 29 preferably multiplexes the incoming STS-1signals to be managed on a cell basis into higher rate STS-n signals and provides them to data switch 22. It should be noted that Vx director may pass the signals on without multiplexing them into higher rate signals or the signals may be passed directly from time slot interchanger 28 on to VT time slot interchanger 21 and/or data switch 22.

Vx distributor may also make copies of the incoming signals and provide them to a spare VT time slot interchanger and data switch (not shown).

As described above, VT time slot interchanger 21 manages the bandwidth of signals entering it on a VT basis and data switch 22 manages the bandwidth of signals entering it on a cell basis.

Both data switch 22 and VT time slot interchanger 21 pass managed signals at STS-n rates such as STS-12 s on to Vx selector 30. If an active/spare arrangement is utilized, Vx selector 30 will select the signals from the active data switch 22 and VT time slot interchanger 21 to pass on to time slot interchanger 31. Additionally, if Vx distributor 29 multiplexed the signals it accepted, Vx selector 30 will demultiplex them back into the STS-n rates equivalent to those that entered the Vx distributor 29, such as STS-1s.

Time slot interchanger 31 reassembles the signals received from Vx selector 30 back into the appropriate arrangement to match that of the signals received at the inputs to time slot interchanger 28. Thus, time slot interchanger 31 undoes the arranging of the signals that was performed to route the signals to either VT time slot interchanger 21 or data switch 22. Time slot interchanger 31 then provides these signals to 2:1 selector 32.

As discussed above, STS time slot interchanger 20 manages the signals it receives (from 1:2 bridge 27) on an STS level. It provides managed signals to 2:1 selector 32.

2:1 selector 32 then selects the appropriate input line to be passed on to the APS distributor 33 based upon whether the bandwidth was to be managed at a STS level, a VT level or a data cell level. The 2:1 selector then provides connectivity between the appropriate input line and APS distributor 33.

In an active/spare arrangement, APS distributor 33 will provide the output signals to the active output interfaces. If any output interfaces are of a higher data rate than that of the signals received by APS distributor 33, APS distributor 33 may multiplex them up to the requisite rates.

Figure 3:
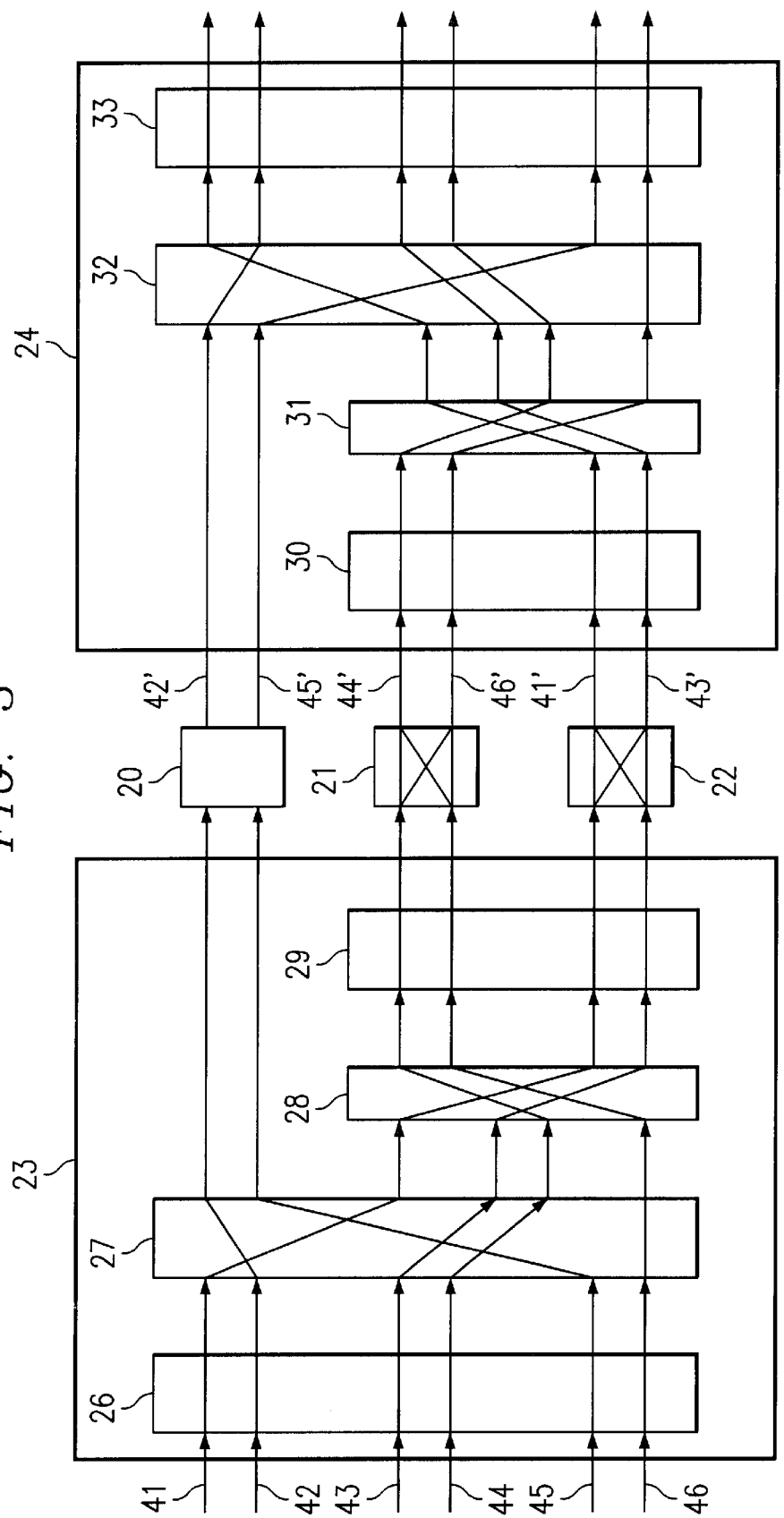
FIG. 3 is an example of traffic flow through the network element depicted in FIG. 2.

An example of traffic flow through a network element according to an embodiment of the present invention as depicted in FIG. 2 is shown in FIG. 3. In this example, input signals 41 and 43 are to be managed on a data cell level input signals 42 and 45 are to be managed on a STS level and input signals 44 in 46 are to be managed on a VT level.

Input signals 41 and 43 are both routed to APS selector 26. As these are active signals, APS selector routes them on to 1:2 bridge 27. Because a network operator has dialed these signals to be managed on a data cell level, incoming signals 41 and 43 are connected to time slot interchanger 28 by 1:2 bridge 27. Time slot interchanger 28 then switches incoming signals 41 and 43 so as to route them to data switch 22 and provides incoming signals 41 and 43 to Vx distributor 29. Vx distributor 29 copies incoming signals 41 and 43 and provides the signals to both data switch 22 and a spare data switch (not shown). Data switch 22 then manages the bandwidth within the incoming signals 41 and 43 and passes managed signals out to Vx selector 30. Vx selector selects the managed signals 41' and 43' from active data switch 22 and provides them to time slot interchanger 31. Time slot interchanger 31 then routes the managed signals 41' and 43' to 2:1 selector 32. Because input signals 41 and 43 were to be managed on a data cell basis, 2:1 selector passes managed signals 41' and 43' on to APS distributor 33. APS distributor passes managed signals 41' and 43' out to the appropriate active output interfaces (not shown).

The data flow for input signals 42 and 45 is somewhat different. Because they are to be managed on an STS level, input signals 42 and 45 are input to the APS selector 26. As input signals 42 and 45 are on active input interfaces, APS selector 26 passes them onto 1:2 bridge 27. 1:2 bridge 27 then provides connectivity for input signals 42 and 45 to time slot interchanger 20. Time slot interchanger 20 then manages the bandwidth on an STS level and passes the managed signals 42' and 45' onto 2:1 selector 32. 2:1 selector 32 provides connectivity between STS time slot interchanger 20 and APS distributor 33 for managed signals 42' and 45' because they were to be managed at an STS level. APS distributor 33 outputs managed signals 42' and 45' to the appropriate active output interfaces.

The data flow for input signals 44 and 46 is also different. Input signals 44 and 46 are passed to APS selector 26. As these are active signals, APS selector routes them on to 1:2 bridge 27. Because they are to be managed on a VT level, 1:2 bridge 27 provides connectivity for incoming signals 44 and 46 to time slot interchanger 28. Time slot interchanger 28 then switches incoming signals 44 and 46 so as to route them to VT time slot interchanger 21 and provides input signals 44 and 46 to Vx distributor 29. Vx distributor 29 copies input signals 44 and 46 and provides the signals to both VT time slot interchanger 21 and a spare time slot interchanger (not shown). VT time slot interchanger 21 manages the bandwidth of incoming signals 44 and 46 on a VT level and outputs managed signals 44' and 46' to Vx selector 30. Vx selector selects the managed signals 44' and 46' from active VT time slot interchanger 21 and provides them to time slot interchanger 31. Time slot interchanger 31 connects managed signals 44' and 46' to 2:1 selector 32. Because input signals 44 and 46 were to be managed on a VT basis, 2:1 selector 32 provides managed signals 44' and 46' to APS distributor 33. APS distributor 33 then provides managed signals 44' and 46' to the appropriate active output interfaces.

Figure 4:
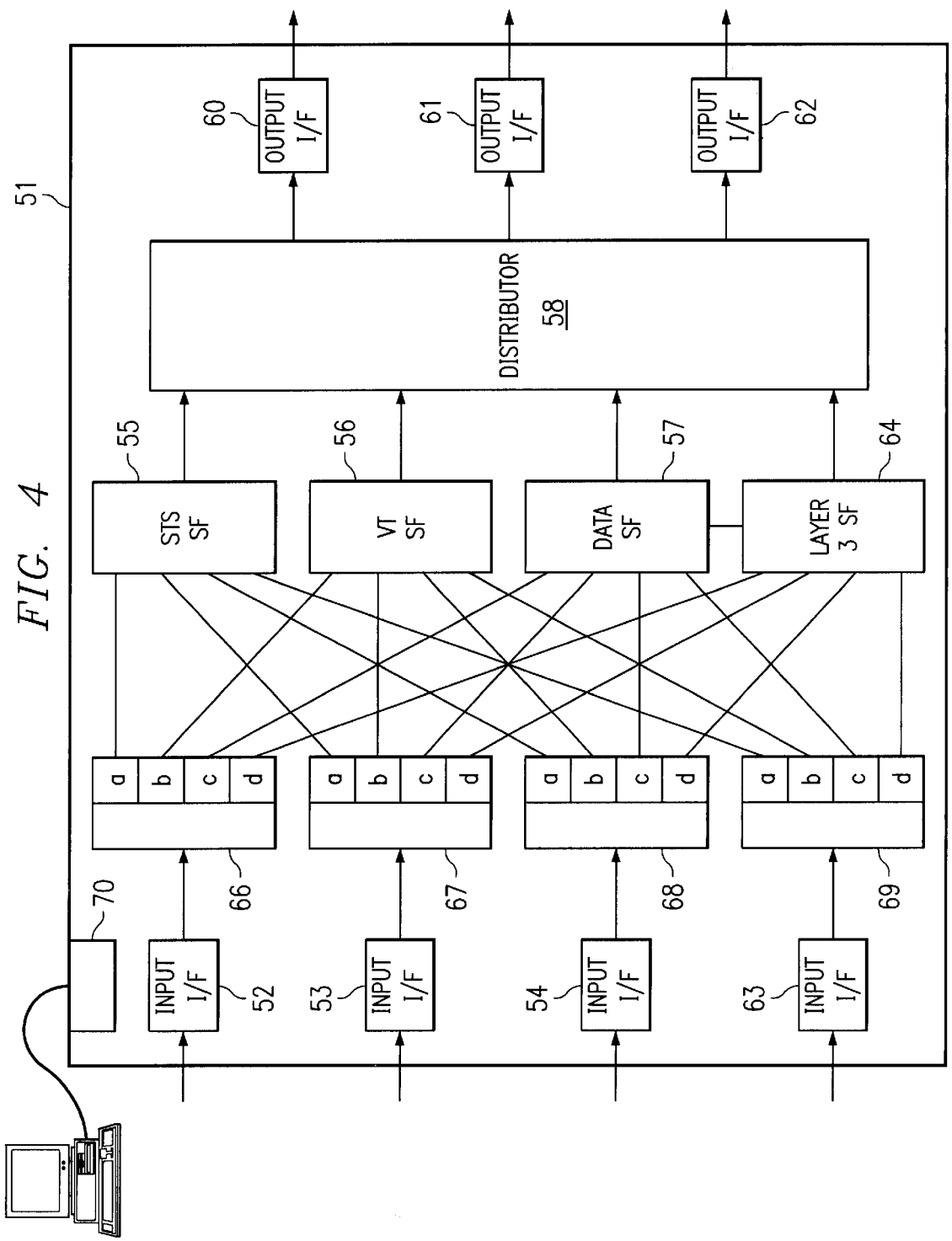
FIG. 4 is a block diagram of a network element according to another embodiment of the present invention.

FIG. 4 depicts another embodiment of present invention. In that figure, input signals are accepted into network element 51 through input interfaces 52, 53 and 54. Network element 51 accepts different signal types and formats from the telecommunications network. For example, input interface 52 may accept a DS 3 signal, input interface 53 may accept a DS 1 signal, and input interface 54 may accept data traffic on an OC-3 line. The signals from input interfaces 52, 53 and 54 are then routed to the appropriate bandwidth management device through connectors 66a–66c, 67a–67c and 68a–68c, respectively. Preferably, input interfaces 52, 53 and 54 reside on cards which slide into a card cage. Connectors 66a–66c, 67a–67c and 68a–68c would reside on the backplane of the card cage and make contact with input interfaces 52, 53 and 54, respectively, when the cards have been inserted into the cage. Each of the connectors a–c may reside on a single connector or multiple connectors. Connectors 66a, 67a and 68a would provide connectivity to STS time slot interchanger 55. Connectors 66b, 67b and 68b would provide connectivity to VT time slot interchanger 56. Connectors 66c, 67c and 68c would provide connectivity to data switch 57.

There may also be a Layer 3 switch 64 connected to data switch 57, to input interface card 63, and to STS distributor 58. Additionally, Layer 3 switch 64 can communicate with data switch 57 to provide Layer 3 switching functionality.

STS time slot interchanger 55, VT time slot interchanger 56, data switch 57 and Layer 3 switch 64 are connected to STS distributor 58. STS distributor 58 than distributes signals it receives from STS time slot interchanger 55, VT time slot interchanger 56, data switch 57 and Layer 3 switch 64 to the appropriate output interfaces 60 through 62. The signals output from interface cards 60 through 62 can be of an OC-n type.

Alternatively, the STS selector 58 may be replaced by the use of connectors similar to 66a–66d, 67a–67d, 68a–68d and 69a–69d attached to output interfaces 60 through 62 providing connectivity to STS time slot interchanger 55, VT time slot interchanger 56, data switch 57 and Layer 3 switch 64.

In the embodiment of FIG. 4, the selectability of which input interfaces 52 through 54 and 63 are mapped to which elements 55 through 57 and 64 is managed by a network operator through user interface 70. Alternatively, this can be done automatically by detecting the presence of a certain type of input interface card in a slot in the device upon power up, or by detecting the type of traffic being carried by the input interface cards 52 through 54 and 63. As another alternative, this could be done on the input interface card itself through the use of a switch or similar device.

Preferably, the selectability function would be implemented through the use of software, but may be implemented through hardware, such as switches or relays, or through firmware.

Figure 5:
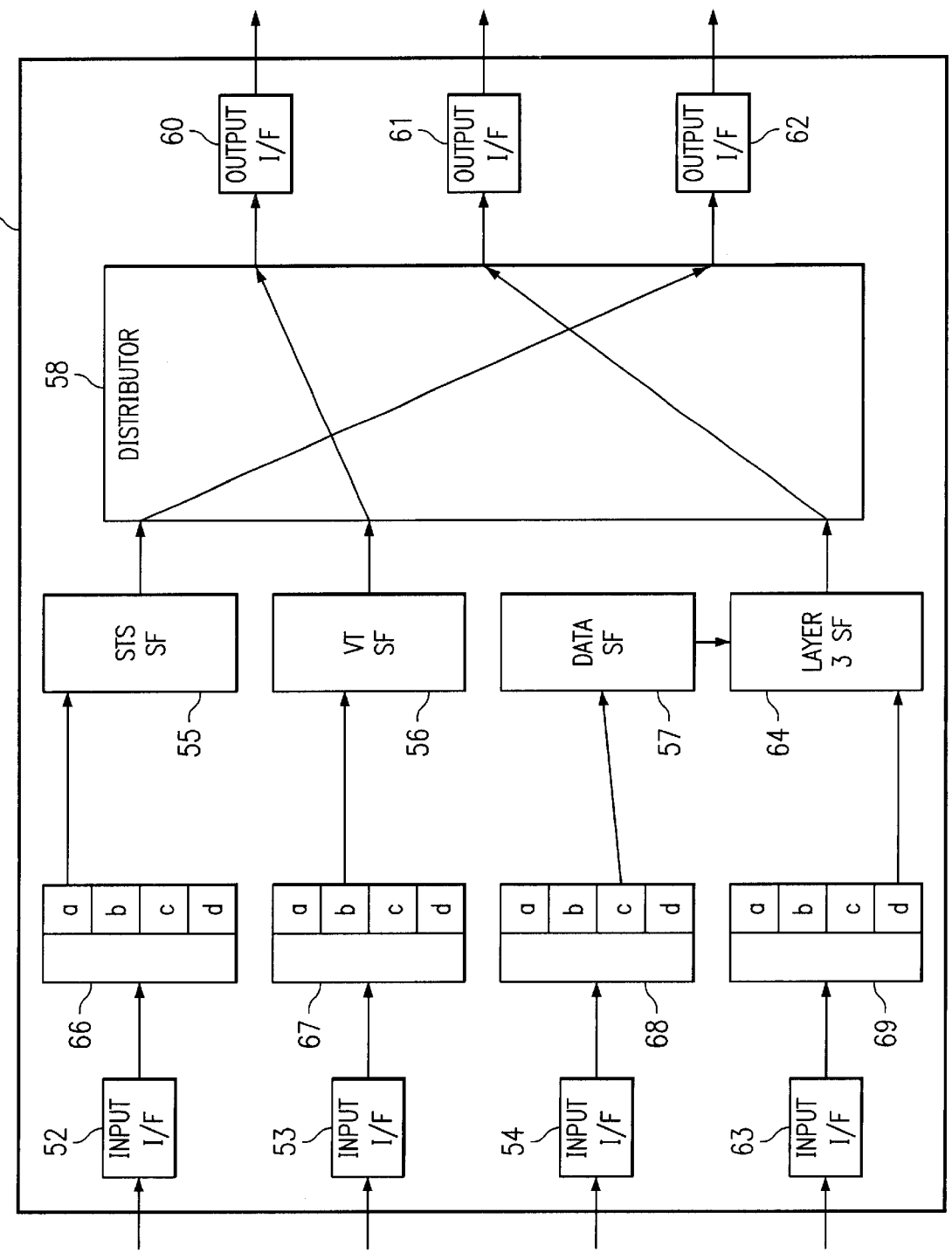
FIG. 5 is a block diagram showing a sample of traffic flow through the embodiment depicted in FIG. 4.

A sample of traffic flow through the embodiment depicted in FIG. 4 is shown in FIG. 5. The DS 3 signal received by input interface 52 is built into an STS-n signal and routed by connector 66a to STS time slot interchanger 55. STS time slot interchanger 55 manages the bandwidth of this signal on an STS level and outputs an STS-n signal to STS distributor 58. This signal is then routed to output interface 62 and output to the network.

The DS 1 signal received by input interface 53 is built into an STS-n signal and passed to VT time slot interchanger 56 through connector 67b. VT time slot interchanger 56 manages the bandwidth of this signal on a VT level and outputs and STS-n signal to STS distributor 58. This signal is then routed to output interface 60 and output to the network.

The data traffic received by input interface 54 is built into an STS-n signal and passed to data switch 57 through connector 68c. Data switch 57 manages the bandwidth of data signals sent into it on a cell level and outputs an tSTS-n signal. This signal is passed to Layer 3 switch, if Layer 3 switching is desired.

A data connection from a LAN, for instance, may be input into input interface 63 and that data may be passed on to Layer 3 switch 64 through connector 69d. Layer 3 switch 64 then manages the Layer 3 data and outputs managed data to STS distributor 58. This data is then routed to output interface 61 and output to the network.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

We claim:

1. A communications device comprising:
   at least an input port, said input port configured so as to accept an input signal from a network;
   a selector, said selector being capable of selectively routing said input signal to a cell/packet bandwidth manager, a STS bandwidth manager or a VT bandwidth manager;
   a cell/packet bandwidth manager, said cell/packet bandwidth manager being capable of receiving said input signal from said selector and being outfitted so as to manage bandwidth within said input signal on a cell/packet level;
   an STS bandwidth manager, said STS bandwidth manager being capable of receiving said input signal from said selector and being outfitted so as to manage bandwidth within said input signal on an STS-n level;
   a VT bandwidth manager, said VT bandwidth manager being capable of receiving said input signal from said selector and being outfitted so as to manage bandwidth within said input signal on a VT-n level; and at least an output port, said output port being capable of outputting signals received from at least one of said cell/packet bandwidth manager, said STS bandwidth manager and said VT bandwidth manager.

2. A communications device as in claim 1, wherein said STS bandwidth manager comprises a time slot interchanger.

3. A communications device as in claim 1, wherein said VT bandwidth manager comprises a time slot interchanger.

4. A communications device as in claim 1, wherein said cell/packet bandwidth manager comprises a packet switch.

5. A communications device as in claim 1, wherein said cell/packet bandwidth manager comprises an ATM switch.

6. A communications device as in claim 1, wherein said ATM switch is capable of managing a virtual channel and a virtual path of said input signal.

7. A communications device as in claim 1, wherein said selector selectively routes said signal based upon input from a network operator.

8. A communications device comprising:

an input port, said input port configured so as to accept an input signal from a network;

at least a connector, said connector providing connectivity between said input port and at least a cell/packet bandwidth manager, a STS bandwidth manager or a VT bandwidth manager;

a cell/packet bandwidth manager, said cell/packet bandwidth manager being capable of receiving said input signal from said connector and being outfitted so as to manage bandwidth within said input signal on a cell/packet level;

an STS bandwidth manager, said STS bandwidth manager being capable of receiving said input signal from said connector and being outfitted so as to manage bandwidth within said input signal on an STS-n level;

a VT bandwidth manager, said VT bandwidth manager being capable of receiving said input signal from said connector and being outfitted so as to manage bandwidth within said input signal on a VT-n level; and at least an output port, said output port being capable of outputting signals received from at least one of said cell/packet bandwidth manager, said STS bandwidth manager and said VT bandwidth manager.

9. A communications device as in claim 8, wherein said STS bandwidth manager comprises a time slot interchanger.

10. A communications device as in claim 8, wherein said VT bandwidth manager comprises a time slot interchanger.

11. A communications device as in claim 8, wherein said cell/packet bandwidth manager comprises a packet switch.

12. A communications device as in claim 8, wherein said cell/packet bandwidth manager comprises an ATM switch.

13. A communications device as in claim 12, wherein said ATM switch is capable of managing a virtual channel and a virtual path of said input signal.

14. A communications device as in claim 8, wherein said input signal is selectively routed to one of said STS bandwidth manager, said VT bandwidth manager and said cell/packet bandwidth manager based upon input from a network operator.

15. A communications device as in claim 8, further comprising:

a Layer 3 switch;

wherein said at least a connector provides connectivity between said input port and at least said cell/packet bandwidth manager, said STS bandwidth manager, said VT bandwidth manager or said Layer 3 switch and said output port being capable of outputting signals received from at least one of said cell/packet bandwidth manager, said STS bandwidth manager, said VT bandwidth manager and said Layer 3 switch.

16. A communications device as claimed in claim 15, wherein said cell/packet bandwidth manager and said Layer 3 switch are electrically coupled to each other so that signals may pass therebetween.

\* \* \* \* \*

UNITED STATES PATENT AND TRADEMARK OFFICE
CERTIFICATE OF CORRECTION

PATENT NO. : 6,396,847 B1
DATED : May 28, 2002
INVENTOR(S) : Hamid Rezaie et al.

It is certified that error appears in the above-identified patent and that said Letters Patent is hereby corrected as shown below:

Column 1,
Line 21, delete second occurrence of "the".
Line 50, delete first occurrence of "and" and insert -- an --.

Column 2,
Line 36, after "is" insert -- to --.
Line 42, delete first occurrence of "the".

Column 3,
Line 55, after "director" insert -- 29 --.

Column 4,
Line 33, after "level" insert -- , --.
Line 35, after "44" delete "in" and insert -- and --.

Column 6,
Line 33, delete "tSTS-n" and insert -- STS-n --.

Signed and Sealed this

Thirty-first Day of December, 2002

JAMES E. ROGAN
*Director of the United States Patent and Trademark Office*